UNITED STATES PATENT OFFICE.

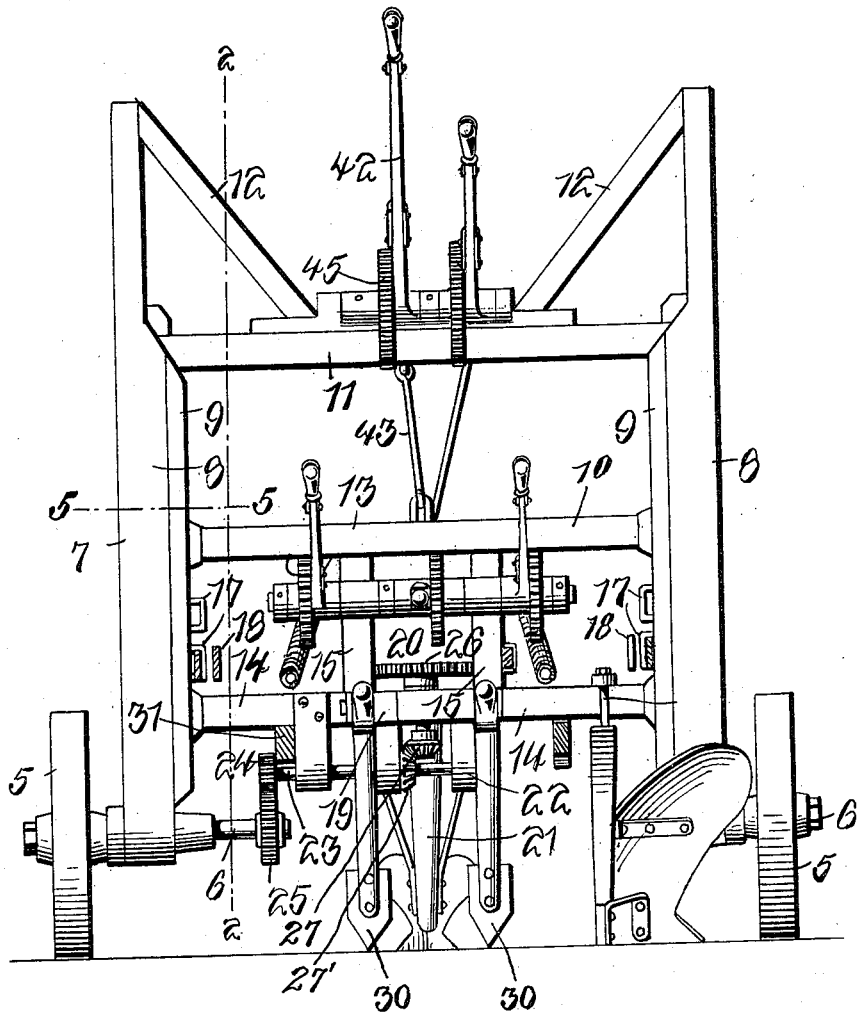

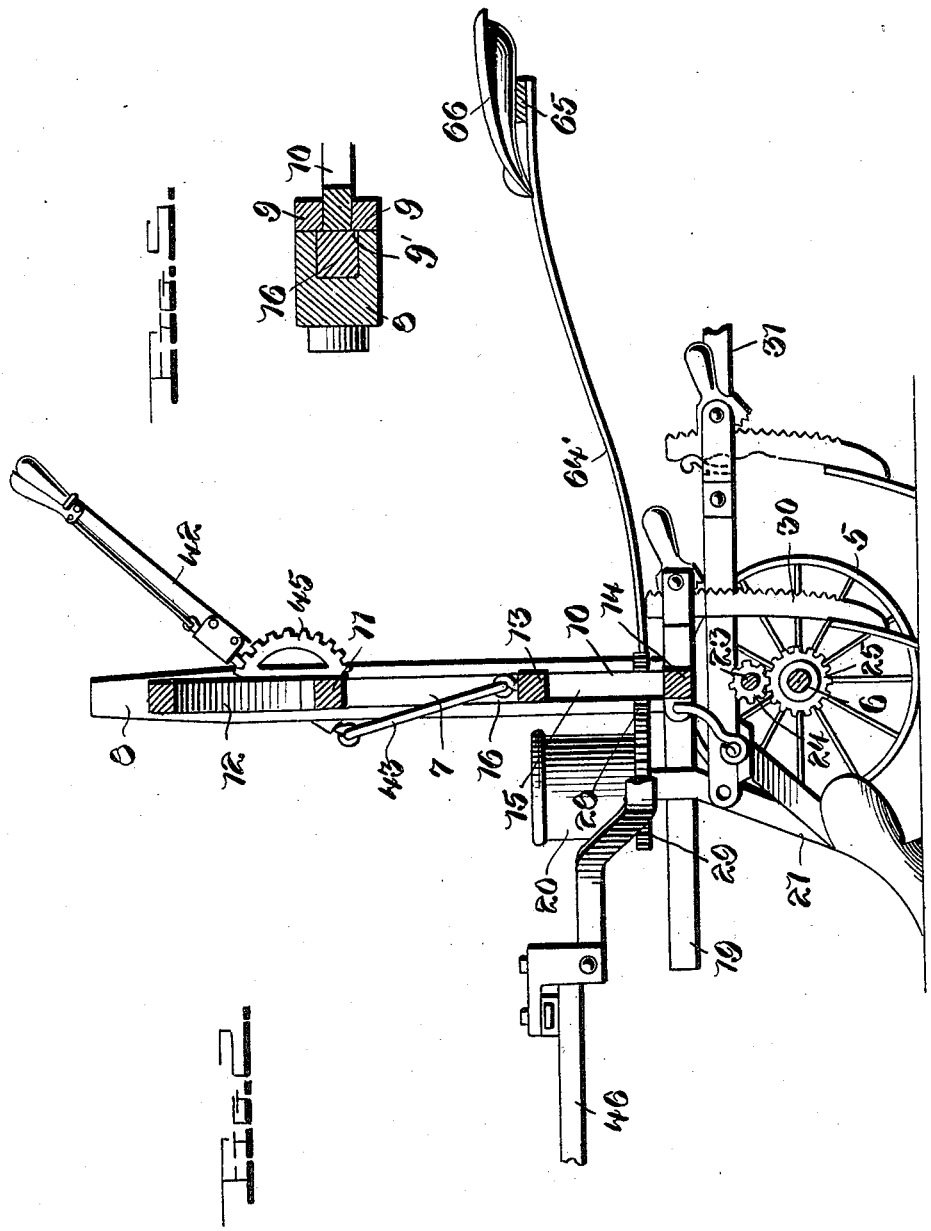

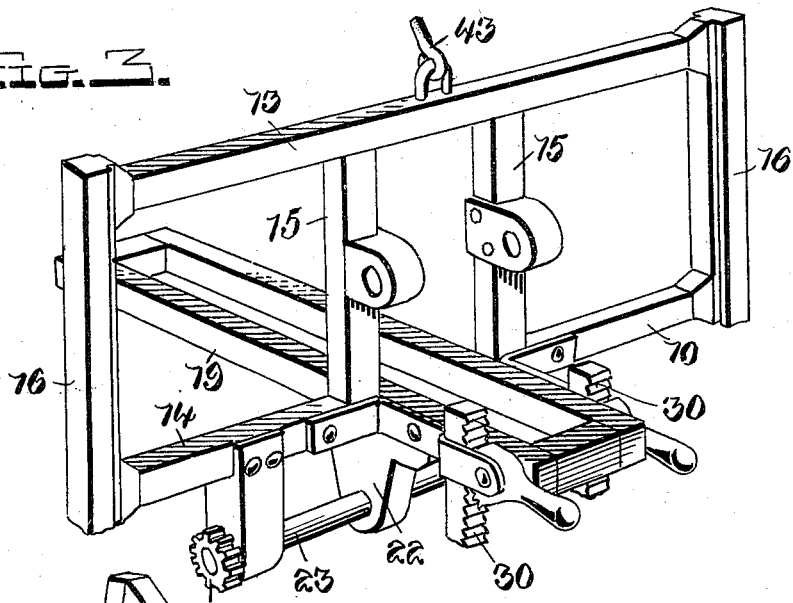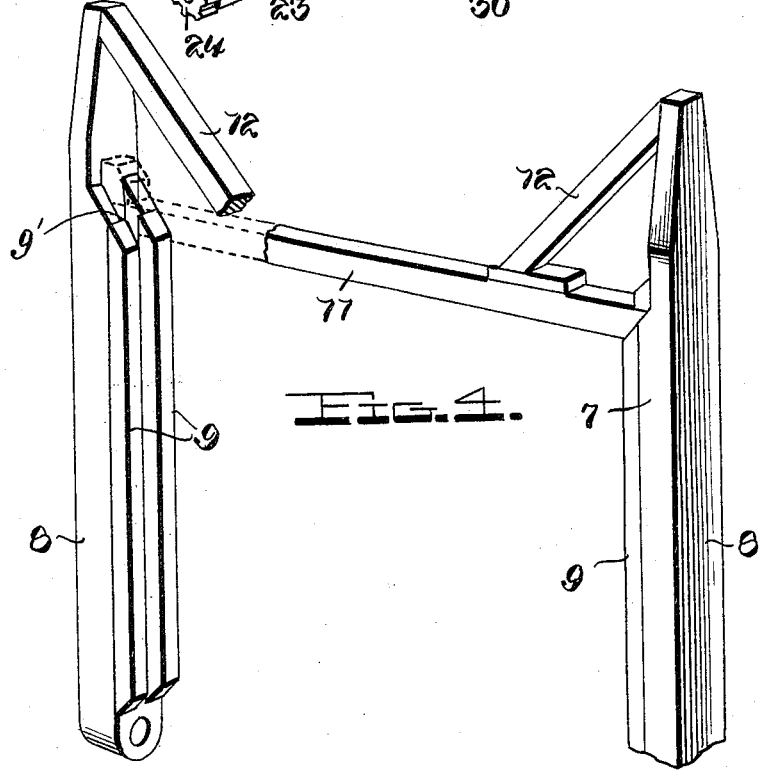

EWELL MONROE DOWDY, OF WATER VALLEY, TEXAS.

SEED-PLANTER.

981,395.  Specification of Letters Patent.  Patented Jan. 10, 1911.

Application filed April 2, 1910. Serial No. 553,146.

*To all whom it may concern:*

Be it known that I, EWELL M. DOWDY, a citizen of the United States, residing at Water Valley, in the county of Tom Green and State of Texas, have invented certain new and useful Improvements in Seed-Planters, of which the following is a specification, reference being had to the accompanying drawings.

This invention relates to seed planting machines and has for its object to improve and simplify the construction of machines of this character and to increase the general efficiency and durability of the same.

Another object resides in the provision of a vertically movable frame carrying the seed planting mechanism, said mechanism being operably connected to one of the supporting wheels, and means for elevating the frame to throw the planting mechanism out of operation.

A still further object of the invention is to provide guides arranged upon the wheel axles of the machine, a frame vertically movable in the guides and an adjusting lever mounted between the guides and connected to said frame to elevate the seed planting mechanism.

With these and other objects in view, the invention consists of the novel features of construction and the combination and arrangement of parts hereinafter fully described and claimed, and illustrated in the accompanying drawings, in which—

Figure 1 is a rear elevation of a machine embodying my invention; Fig. 2 is a section taken on the line 2—2 of Fig. 1; Fig. 3 is a detail perspective view of the vertically movable frame; Fig. 4 is a similar view partly broken away of the guide for said frame; and Fig. 5 is a detail section taken on the line 5—5 of Fig. 1.

Referring more particularly to the drawings 5 indicates the ground wheels in the hubs of which are keyed the axle spindles 6. These spindles are rotatably mounted in the lower ends of a vertically disposed frame structure 7. This frame structure, as shown in Fig. 4, comprises the vertical parallel uprights or guides 8. Each of these uprights are formed with the inwardly extending parallel vertical flanges 9 which form guide members for a frame 10 which carries the seed planting mechanism. At the upper ends of the guide flanges the uprights are connected by a transverse bar 11 which secures together and braces said uprights and further serves as a stop to limit the upward movement of the carrying frame 10. The uprights 8 are also braced by means of the inclined bars 12 which are secured to the upper ends of the uprights and to the cross bar 11.

The carrying frame 10 comprises the upper transverse bar 13 and the two lower transversely positioned bars 14. These bars 13 and 14 are arranged in parallel relation and the inner ends of the lower bars 14 are connected with the upper transverse bar 13 by means of the vertical posts 15. The outer ends of the bars 13 and 14 are connected by means of the bars 16 which are disposed between the guide flanges 9. It will be noted on reference to Fig. 4 that the flanges 9 are formed in their opposed faces with the shoulders 9', and it is between these shoulders and the faces of the guides 8 that the bars 16 are disposed for vertical movement. Spaced eyes 17 are secured to the inner faces of each of the heads 16 and in these eyes the ends of the frame 18 are secured. Arranged between the lower ends of the connecting posts 15 and extending forwardly and rearwardly thereof there is a frame 19. This frame supports upon its forward end a seed box 20 from which a seed directing chute 21 depends. The frame 19 has secured to its under side the bearings 22 in which a transverse shaft 23 is mounted. Upon one end of this shaft a pinion 24 is secured, said pinion being adapted to mesh with the teeth of a pinion 25 secured to the inner end of one of the axle spindles 6. A vertical shaft 26 is mounted in the frame 19 and has a beveled gear 27 secured on its lower end which meshes with a similar gear 27' secured on the transverse shaft 23. A gear 28 is also secured to the upper end of the shaft 26 and meshes with the teeth of a gear 29 which actuates the seed dropping mechanism. This mechanism is of the usual construction commonly known in the art and will not here be set forth in detail. A cultivator standard and foot 30 is adjustably arranged upon each side of the longitudinal frame 19 at its rear end. A plurality of cultivator teeth carrying bars 31 may also be employed in connection with the dropping mechanism and arranged for movement therewith or may be independently adjusted. The detail construction and operation of these cultivator bars will form the subject-matter of a separate application to be filed at a later date.

In the operation of the invention, the frame 10 together with the seed dropping mechanism carried thereby is adapted to be vertically moved in the guides 8. To this end a lever 42 is mounted upon the connecting bar 11 which extends between the upright guides at their upper ends. A rod 43 connects the end of this lever to the upper transverse bar 13 of the movable frame. The lever 42 is held in its adjusted position by the engagement of the usual spring controlled dog carried thereby with the teeth of a rack segment 45 secured to the bar 11. Thus it will be seen that by simply operating the lever 42, the frame and the various elements carried thereby are simultaneously raised and lowered and the gear 29 of the seed actuating mechanism disengaged from the gear 28, thus throwing the dropping mechanism out of operation and instantly stopping the dropping of the seed.

By means of the construction and arrangement of parts above set forth, a machine of very high efficiency is produced. When working in hilly and uneven ground, the dropping mechanism may be raised or lowered to suit the varying conditions whereby liability of damage to the delicate parts of the dropping mechanism is obviated.

The usual draft tongue 46 is, of course, provided and connected to the forward end of the frame 18. In the practical development of the machine, means will be provided whereby this tongue may be locked against transverse oscillation so that the draft animals will be prevented from moving out of a straight line and upon the ground into which the seed is to be deposited. This tongue locking mechanism will also be made the subject-matter of a separate application. To the ends of the frame 18 rearwardly extending spring metal bars 64' are secured. The rear ends of these bars are connected by a cross bar 65 upon which the driver's seat 66 is mounted.

From the foregoing it will be seen that I have devised a comparatively simple, durable and practical seed planting machine, and while I have shown and described the preferred combination and arrangement of the various elements embodied in its construction, it will be obvious that the various parts may be greatly varied in form and proportion without departing from the essential features or sacrificing any of the advantages of the invention.

I claim—

1. In a machine of the character described, the combination with vertical parallel wheel supported uprights, longitudinal flanges formed on said uprights between their ends, of a frame vertically movable between the flanges of the uprights, a transverse bar connecting the uprights adjacent to their upper ends, seed carrying mechanism carried by said frame, a shaft rotatably mounted beneath the frame and geared to the wheel axle, gearing connecting said shaft to the seed dropping mechanism, and an adjusting lever mounted upon said transverse bar connecting the uprights and connected to said frame to vertically adjust the same.

2. In a machine of the character described, the combination with wheel supported vertical uprights having guide flanges formed thereon, of a frame comprising parallel transverse bars, vertical bars connecting said transverse bars at their ends and disposed between the guide flanges, a forwardly extending support carried by said frame, seed dropping mechanism mounted on said support, a rotatable shaft carried by the frame geared to the wheel axle, gearing connecting said shaft and the seed dropping mechanism, and means connected to said frame to vertically adjust the same between the uprights.

3. In a machine of the character described, the combination with wheel supported vertical uprights having parallel guide flanges formed thereon between their ends and a bar connecting said uprights adjacent to their upper ends, of a frame comprising spaced upper and lower transverse bars, intermediate vertical bars connecting the transverse bars, guide heads connecting the ends of the transverse bars and disposed between the flanges of the uprights, the base flanges of said uprights having shoulders formed therein to retain the heads between the same, an adjusting lever mounted upon the transverse bar connecting the uprights, a link rod connecting said lever to the frame, a forwardly and rearwardly extending frame arranged between the intermediate vertical connecting bars of said movable frame, seed dropping mechanism arranged on the forward end of the last named frame, a rotatable shaft mounted beneath the movable frame and geared to the wheel axle, and gearing normally connecting said shaft and the seed dropping mechanism.

In testimony whereof I hereunto affix my signature in the presence of two witnesses.

EWELL MONROE DOWDY.

Witnesses:
J. G. Cooper,
J. C. Ditmore.